United States Patent [19]

Tison

[11] 4,445,984

[45] May 1, 1984

[54] PARASITIC ELECTRODIALYSIS RECOVERY OF DISSOLVED CHEMICALS FROM DILUTE SOLUTIONS DIRECTLY INTO A PLATING BATH

[75] Inventor: Richard P. Tison, Pontiac, Mich.

[73] Assignee: General Motors Corporation, Detroit, Mich.

[21] Appl. No.: 390,231

[22] Filed: Jun. 21, 1982

[51] Int. Cl.$^3$ .......................... C25D 3/12; C02F 1/46; B01D 13/02
[52] U.S. Cl. .................................. 204/49; 204/45 R; 204/151; 204/180 P; 204/301; 204/DIG. 13; 204/112
[58] Field of Search ...................... 204/49, 180 P, 112, 204/301, DIG. 13, 151, 45 R

[56] References Cited

U.S. PATENT DOCUMENTS

| | | | |
|---|---|---|---|
| 2,848,402 | 8/1958 | Van Dorsser et al. | 204/301 |
| 3,616,396 | 10/1971 | Swanson | 204/301 |
| 3,766,049 | 10/1973 | Smith | 204/301 |
| 4,124,458 | 11/1978 | Moeglich | 204/180 P |
| 4,229,280 | 10/1980 | Horn | 204/301 |

FOREIGN PATENT DOCUMENTS 52-65182  5/1977  Japan .......................... 204/DIG. 13

OTHER PUBLICATIONS

Plating and Surface Finishing, Jul. 1979, pp. 28–31, P. Dem. Spatz, "A Case History of Reverse Osmosis Used for Nickel Recovery in Bumper Recycling".

Primary Examiner—Howard S. Williams
Assistant Examiner—Terryence Chapman
Attorney, Agent, or Firm—Douglas D. Fekete

[57] ABSTRACT

In a preferred embodiment, plating chemicals are recovered from contaminated rinse water using an electrodialysis recovery unit immersed directly in an electroplating bath between a cathode intended to be plated and an anode. Electrodialysis is driven parasitically by the electroplating currents, thereby eliminating the cost of additional equipment dedicated solely for electrodialysis. The unit is sized and positioned so that only a relatively minor portion of the total plating current is employed for electrodialysis, thereby permitting a sufficiently high current density at the cathode to electrodeposit a dense, commercially acceptable metal plate.

3 Claims, 3 Drawing Figures

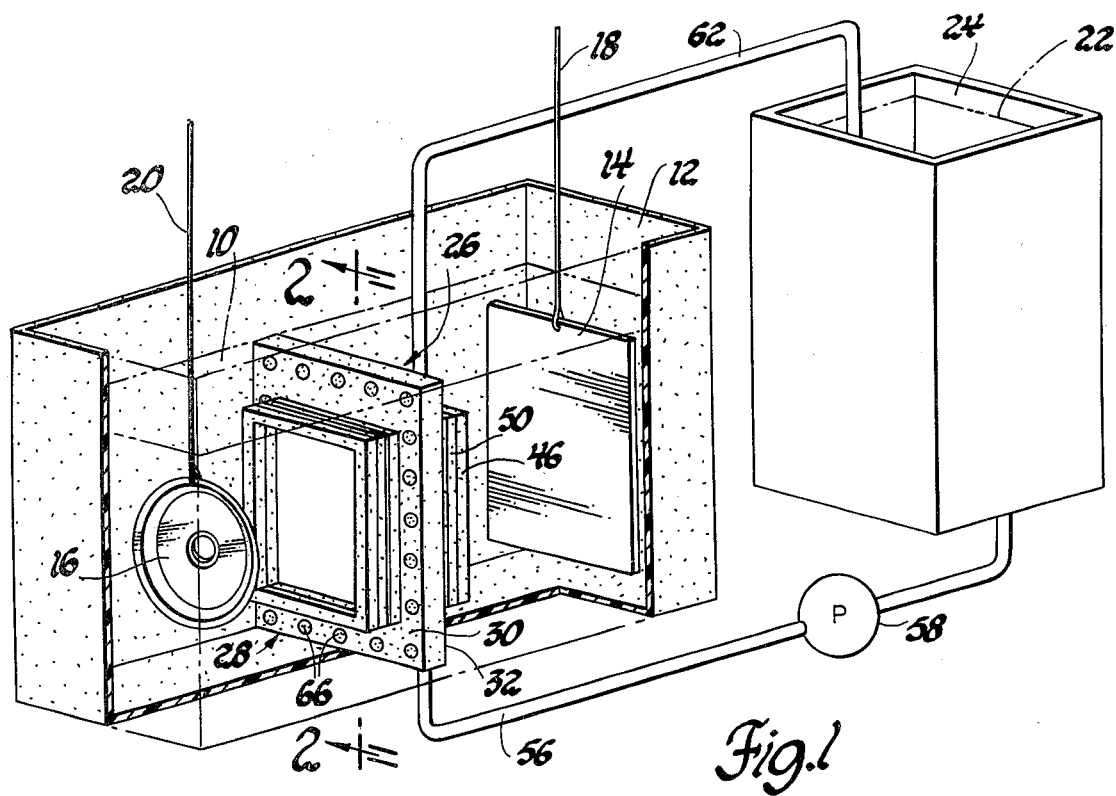
Fig.1
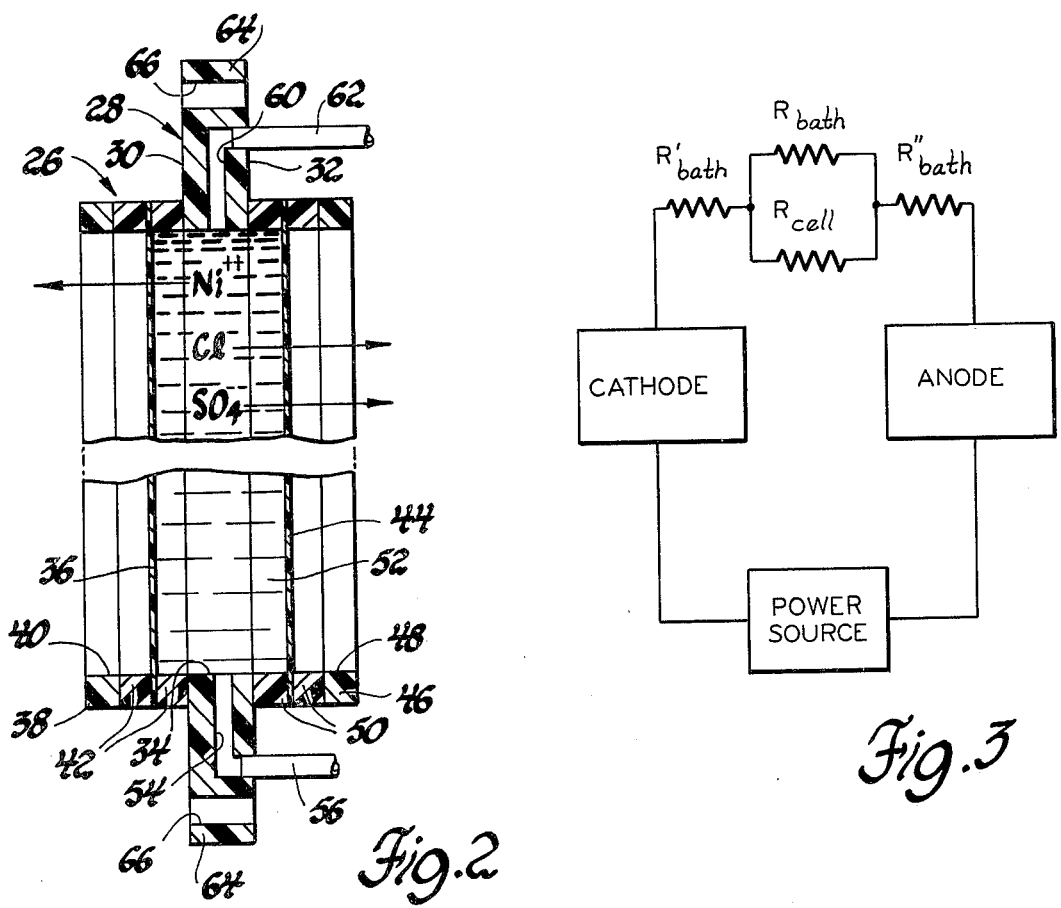
Fig.2
Fig.3

PARASITIC ELECTRODIALYSIS RECOVERY OF DISSOLVED CHEMICALS FROM DILUTE SOLUTIONS DIRECTLY INTO A PLATING BATH

BACKGROUND OF THE INVENTION

This invention relates to a method for electrodialytically recovering valuable metal-plating chemicals from dilute aqueous solution, such as contaminated rinse water, for use in an aqueous electroplating bath. More particularly, this invention relates to an electrodialytic recovery method adapted to be carried out within an electroplating bath concurrent with metal-plating operations and utilizing a portion of the plating current to extract chemicals from dilute solution directly into the bath.

A metal plate is electrodeposited onto a workpiece by immersing the workpiece in an aqueous bath having a relatively concentrated ionic metal species dissolved therein and cathodically biasing the workpiece to reduce and plate the metal. The plated workpiece is removed from the bath and cleansed with clean water to rinse away residual plating solution dragged out with it. The rinse water thereby becomes contaminated by low concentrations of valuable plating chemicals.

Electrodialysis has been emmployed to extract the chemicals from the rinse water for return to the bath. The contaminated water flows through a first cell sandwiched between two cells through which flows recovery solution, which may be plating solution from the bath. The rinse water cell is separated from the cell on one side by a membrane selectively permeable to cations and from the opposite cell by a membrane selectively permeable to anions. An electrical potential is suitably applied between the cells to cause cations and anions in the rinse water to migrate through the appropriate membrane into the adjacent recovery cells. The recovery solution is pumped into the plating bath, thereby recycling the chemicals, while the purified water may be reused for rinsing.

Electrodialysis is typically carried out in an apparatus separate from the plating bath and comprising a plurality of alternating rinse and recovery cells. Electrodes are immersed in opposite end cells for applying the needed electrical potential. The electrodes are connected to an electrical power source distinct from the electroplating power source and generally serve no other productive purpose. In one end cell, the current may be carried by metal ions that plate onto the cathode. However, because of the low contaminant concentrations in the rinse water, electrodialysis produces only a very low electrical current, which is too low to achieve a dense plate of commercially acceptable quality. Rather, the plate is rough or dendritic and may grow so as to damage the adjacent membrane. Also, the anode in the opposite end cell tends to deteriorate. Thus, periodic replacement of the electrodes is required to maintain satisfactory performance of the electrodialysis apparatus.

Therefore, it is an object of this invention to provide a method for electrodialytically recovering dissolved ionic plating chemicals from contaminated rinse water for use in a plating bath, which method is adapted to be carried out in-situ within an electroplating bath concurrent with metal-plating operations that produce a desired, dense, high quality plate. The method utilizes the electrodes and electrical current of the plating operations to effectuate electrodialysis and recover the chemicals directly into the bath, thus eliminating the cost and maintenance required for nonproductive electrodes and an additional power supply used solely for electrodialysis, as well as for a pump to transport recovered chemicals to the bath. Furthermore, the method achieves a suitably high current density at the cathode during plating despite on-going electrodialysis to produce the desired plate and does not foul the electrodes, contaminate the bath or otherwise significantly interfere with electroplating operations.

SUMMARY OF THE INVENTION

In a preferred embodiment, an electrodialysis recovery unit, herein referred to as a cell, adapted to receive contaminated rinse water is immersed in an electroplating bath between a workpiece cathode intended to be plated and a cooperating anode. The cell comprises a cation permeable membrane facing the cathode and an anion permeable membrane facing the anode. Cations and anions of plating chemicals in the rinse water are attracted to the cathode and anode, respectively, and migrate through respective membranes into the bath, thereby recovering the plating chemicals for use therein and purifying the rinse water. Furthermore, the electrodialysis cell is sized and positioned so as not to isolate the electrodes in separate portions of the bath, but rather such that the bath is continuous about the cell. Thus, parallel electrical paths are provided between the electrodes: one through the electrodialysis cell and one about the cell. Only a portion of the current generated between the electrodes passes through the cell to drive electrodialysis. This current also plates metal. However, it combines with the current that passes about the cell to produce a high current density at the cathode suitable for depositing a dense, high quality metal plate. Although the proportion of current flowing through each path depends upon many factors, in general, resistance through the cell is substantially greater than through the bath about the cell, due in part to the low concentration of contaminants in the rinse water. As a result, only a relatively minor portion, preferably less than 10%, is caused to flow through the cell and plating operations are not significantly affected. Despite the low proportion of current, the method of this invention recovers a substantial portion of the plating chemicals and reduces the contaminants in the water to a low level suitable for reuse for rinsing.

Thus, in accordance with this invention, electrodialysis is parasitically driven by the electroplating current. The method takes advantage of electrodes and power source already employed for plating. Also, because the chemicals are recovered directly into the bath, no pump is required to return the chemicals to the bath. Thus, this invention significantly reduces the equipment and maintenance required for electrodialysis recovery.

DESCRIPTION OF THE FIGURES

FIG. 1 is a perspective view, partially cut away, showing an electroplating tank comprising an electrodialytic cell in accordance with this invention and also a rinse tank for operation in conjunction with said electroplating tank;

FIG. 2 is a cross-sectional view of the electrodialytic cell in FIG. 1 taken along the lines 2—2 and looking in the direction of the arrows; and FIG. 3 is an electrical schematic diagram depicting the electrical circuit employed for electroplating and electrodialysis in accordance with this invention.

DETAILED DESCRIPTION OF THE INVENTION

In a preferred embodiment, the method of this invention is adapted to recycle dragged-out chemicals from a rinse solution to a Watt's nickel plating bath, although it is apparent that the method is generally applicable to other electroplating systems. Referring to FIG. 1, a Watt's solution 10 is contained in an open-top tank 12. The Watt's solution preferably comprises about 272 grams per liter hydrated nickel sulfate, $NiSo_4.6H_2O$; about 44 grams per liter hydrated nickel chloride, $NiCl_2.6H_2O$; and about 30 grams per liter boric acid, $H_3BO_3$; dissolved in water. The pH is between about 3.2 to 3.5 and the operating temperature is about 50° C. In water, the chemicals dissociate to form ions including nickel cations and sulfate and chloride anions. Immersed in bath 10 are a metallic nickel sheet 14 adapted to serve as an anode and an automobile wheel hubcap 16 adapted to serve as a cathode. Sheet 14 and hubcap 16 are respectively connected through electrical lead wires 18 and 20 to positive and negative poles of a direct current electrical power source (not shown). During operation, the power source causes electrical current to flow through bath 10 and reduces nickel cations at cathode hubcap 16 to plate metallic nickel onto the hubcap. Nickel plating prepares hubcap 16 to subsequently receive a bright, decorative chromium plate. After the desired nickel plate is deposited, hubcap 16 is removed from bath 10 and immersed in a rinse water bath 22 contained in a second tank 24 to wash away residual Watt's solution that clings to the hubcap. As a result, Watt's plating chemical build up and contaminate rinse water 22.

In accordance with this invention, plating chemicals are recovered from rinse water 22 into bath 10 using an electrodialytic cell 26 shown in FIGS. 1 and 2. Cell 26 comprises an acrylic frame 28 having a first side 30 facing cathode hubcap 16 and an opposite side 32 facing anode sheet 14 and defining an opening 34 therethrough. Opening 34 on side 30 is covered by a cation-selective permeable membrane 36 of a heterogeneous type comprising mobile cations and a fixed, negatively charged polymeric matrix consisting of divinylbenzene polystyrene sulfonate, commercially available from Ionac Chemical, a division of Sybron Corporation, N.J., under the trade designation MC-3470. Membrane 36 is perimetrically attached to frame 28 by a cover plate 38 having an opening 40 coextensive with opening 34. Gaskets 42 between membrane 36 and cover plate 38 and between membrane 36 and frame 28 provide liquid-tight seals. Similarly, opening 34 at side 32 is covered by an anion-selective permeable membrane 44 of a heterogeneous type comprising mobile anions and a fixed, positively charged polymeric matrix consisting of divinylbenene polystyrene quaternary amine, commercially available also from Ionac Chemical under the trade designation MA-3475R. Membrane 44 is perimetrically attached to frame 28 by a cover plate 46 having an opening 48 coextensive with opening 34, with gaskets 50 suitably located to provide liquid-tight seals. The assembly is preferably held together by nuts and bolts that extend between cover plate 38 and cover plate 46. Where a metallic nut and bolt is employed, care must be taken to insulate the metal from contact with bath 10 so as not to contaminate the bath. Thus, frame 28 and membranes 36 and 44 cooperate to define a chamber 52 adapted to receive contaminated rinse water for recovering plating chemicals therefrom. A bottom inlet 54 to chamber 52 through frame 28 is connected through a conduit 56 to rinse bath 22. A pump 58 incorporated into conduit 56 pumps water from bath 22 into chamber 52. A top outlet 60 from chamber 52 through frame 28 is connected to a conduit 62 that conveys water back to bath 22. Frame 28 also comprises a marginal extension 64 comprising a plurality of holes 66 therethrough. As can be seen in FIG. 1, cell 26 is sized and positioned in tank 12 so as to form a wall between sheet 14 and hubcap 16 dividing bath 10. Solution on opposite sides of the cell freely communicates through openings 66.

During operation, a series of hubcaps 16 is plated in bath 10 and thereafter rinsed in bath 22, thereby contaminating the bath. Contaminated rinse water is pumped by pump 58 through conduit 56 and inlet 54 into chamber 52. When electrical current is applied to plate hubcap 16, nickel cations in the water in chamber 52 are attracted toward the hubcap 16 and migrate through membrane 36 into bath 10. Similarly, chloride and sulfate anions are attracted toward anode sheet 14 and migrate through membrane 44 into bath 10. Ions from dissociation of boric acid also migrate through the membranes. Thus, the plating chemicals are recovered directly in bath 10. The cleansed water then flows out through outlet 60 and conduit 62 and is returned to bath 22 for reuse. It is noted that cations and anions in bath 10 are attracted in the same directions as those in chamber 52, but cannot migrate through the membranes into the chamber because of the selective nature of the membranes.

In order to obtain a nickel plate on hubcap 16 having acceptable properties including adhesion and appearance, sufficient current is required to produce a current density at the hubcap surface of about 5 amperes per square decimeter, which is suitably obtained by adjusting the voltage applied by the power source. A portion of the current is carried by the out-migration of ions from chamber 52 and thus passes through the cell 26. However, in comparison to the electrical resistance through the bath, the resistance through the cell is relatively high. This is attributed to the relatively low ionic conductance through the rinse water and through membranes 36 and 44. Because of the high resistance, a very high voltage would be necessary to obtain the desired current density solely through the cell, which tends to produce water electrolysis across the cell that damages the membranes. However, in accordance with this invention, electrical current for electrodeposition also flows through holes 66 without passing through cell 26. This current combines with current through the cell to produce the desired current density at hubcap 16 and thus produce the desired nickel plate.

The electrical circuit comprising parallel pathways in accordance with this invention is schematically illustrated in FIG. 3. Since current through electroplating solution encounters resistance, current conducted along either pathway travels through the bath adjacent the cathode and the anode and encounters resistances, $R'_{bath}$ and $R''_{bath}$, respectively. Current conducted through cell 26 encounters a resistance $R_{cell}$. Current traveling through the bath via holes 66 encounters a resistance $R_{bath}$, wherein the subscript "bath" indicates that route is entirely through the bath. $R_{bath}$ is related to the added distance the current travels through the solution to pass about the cell. In accordance with electrical principles, the proportion of cell current to current through the holes, designated $I_{cell}$ and $I_{bath}$, respectively, is related to the ratio of the related resistances as follows:

$$(R_{cell}/R_{bath}) = (I_{bath}/I_{cell})$$

In general, the resistance through the solution is substantially less than the cell resistance so that $R_{bath} < R_{cell}$. Thus, the major portion of current travels through hole 66 to maintain the desired current density. Only a minor portion is involved in electrodialysis to recover the plating chemicals. It has been generally found that a ratio of cell current to current about the cell of about 1 to 3 produces a high rate of recovery without interfering with electroplating. That is, only 25% of the total current is required for electrodialysis. Preferably, less than 10% of the total current is employed for electrodialysis. In general, a higher $R_{bath}$ or a lower $R_{cell}$ increases the proportion of cell current $I_{cell}$. Since the entire current is employed for electroplating, an increase in the cell current increases the amount of chemicals electrodialytically recovered with respect to the amount of metal plated, which is referred to as the recovery rate.

The precise current employed for electrodialysis depends upon several factors. One factor concerns the relative cross-sectional areas of the paths through cell 26 and holes 66. The resistance $R_{bath}$ about the cell is generally inversely related to the cumulative cross-sectional areas of holes 66. Thus, decreasing the area of holes 66, as by selectively plugging holes, increases $R_{bath}$ and thus forces more current through cell 26 for electrodialysis, thereby producing a higher recovery rate. Conversely, opening additional holes 66 reduces the recovery rate. Similarly, cell resistance $R_{cell}$ is related to the area of membranes 36 and 44 covering opening 34, although this is less convenient to change after construction.

Because the generally low concentration of ionic contaminants in the rinse water results in a generally high electrical resistance therethrough, it is preferred to minimize the distance across chamber 52 to reduce the overall resistance through the cell. In the described embodiment, a preferred thickness for frame 28 is about 3.2 mm and for gaskets 42 and 50 is 1.6 mm, so that the distance between flat membranes 36 and 44 is about 6.4 mm, although the membranes tend to be distorted during use. Also, increasing the contaminant level in the rinse water decreases the resistance through the cell. This produces a self-regulation feature for the method of this invention. At low rinse contaminant levels, the resistance is high, but relatively little current is required for recovery. However, a significant increase in the contaminant level reduces $R_{cell}$, causing more current to flow through the cell and automatically increasing the recovery rate. Thus, in continuous operations, the method of this invention automatically adjusts to maintain a stable, low contaminant level in the purified rinse water.

The inclusion of the electrodialysis cell in the plating tank increases the overall resistance between the anode and the cathode, necessitating an increase in the applied voltage to obtain the desired current density. An increase of between 0.4 to 1.4 volts has been found to be suitable. A portion of this voltage increase is attributed to the cross-sectional area taken up by the insulating frame and is nonproductive. However, the voltage increase is relatively insignificant in comparison to the cost of operating a separate electrodialysis unit in addition to the electroplating bath.

While this invention has been described in terms of a certain embodiment thereof, it is not intended to be limited to the above description, but rather to the extent set forth in the claims that follow.

The embodiments of the invention in which an exclusive property or privilege is claimed are defined as follows:

1. An apparatus for electroplating a metal onto a workpiece from an electroplating solution containing an ionic metal species and for recovering dissolved ionic electroplating chemicals from rinse water used to wash residual electroplating solution from prior plated workpieces, said apparatus comprising
   a tank adapted to hold a continuous electroplating bath having a region suitable for temporarily immersing a workpiece therein for electroplating,
   an anode immersed in said bath spaced apart from said workpiece immersion region,
   electrical power means for applying an electrical potential to the anode and an immersed workpiece to cause electrical current to flow through the bath and to plate metal onto the workpiece,
   an electrodialysis recovery unit immersed in the bath between the anode and the workpiece immersion region, said unit comprising a chamber for receiving contaminated rinse water, said unit further comprising a cation-permeable membrane having an inner surface defining the chamber and an outer bath-contacting surface facing the workpiece immersion region and an anion-permeable membrane having an inner surface defining the chamber and an outer bath-contacting surface facing the anode, said unit being sized and positioned such that the electroplating bath forms a continuous path about the unit between the anode and an immersed workpiece suitable for conducting a major portion of the electroplating current, and further such that cations and anions in rinse water within the chamber are caused by the electroplating current to migrate through the cation-permeable membrane and the anion-permeable membrane, respectively, into the bath, and
   means for introducing contaminated rinse water into the electrodialysis recovery unit chamber and withdrawing purified water from the electrodialysis recovery unit chamber.

2. A method for electroplating a metal onto a workpiece temporarily immersed in an electroplating bath and concurrently transferring cations and anions from a dilute solution into the bath, said method comprising
   immersing the workpiece into the electroplating bath spaced apart from an immersed anode,
   introducing the dilute ionic solution into a chamber of an electrodialysis unit immersed in the bath, said unit comprising a cation-permeable membrane facing the workpiece and an anion-permeable membrane facing the anode and being surrounded by the bath such that a continuous path is provided through the bath between the anode and the workpiece about the unit,
   cathodically biasing the immersed workpiece with respect to the anode to electroplate metal onto the workpiece, whereupon current flows between the anode and the cathode, a portion of said current less than the total causing cations and anions in the dilute solution to migrate into the bath through the cation-permeable and anion-permeable membranes, respectively, said current conducted through the unit combining with current conducted through the bath about the unit for electroplating the workpiece, and removing the electroplated workpiece from the bath.

3. A method for electroplating a metal onto a workpiece temporarily immersed in an aqueous electroplating bath and concurrently recovering dissolved ionic electroplating chemicals from contaminated rinse water used to wash residual electroplating solution from prior plated workpieces, said electroplating bath having dissolved therein a platable metal cation and a related anion, said method comprising immersing a workpiece into the electroplating bath spaced apart from an immersed anode, immersing an electrodialysis recovery unit within the bath between the anode and the workpiece, said unit being defined by a first cathode-facing membrane selectively permeable to cations including said platable metal cation, but not to anions, and a second anode-facing membrane selectively permeable to anions, but not cations, said first and second membranes having outer bath-contacting surfaces, said unit being immersed such that a continuous path is formed between the anode and the cathode about the unit, flowing contaminated rinse water into the unit so as to contact the inner surfaces of the membranes, cathodically biasing the immersed workpiece with respect to the anode to electroplate the metal from the bath onto the workpiece, said biasing resulting in an electrical current conducted through the bath such that a relatively minor portion is conducted through the unit and causes cations and anions in the rinse water to migrate through the cation-permeable and anion-permeable membranes, respectively, and to be recovered into the bath, said current through the unit combining with current conducted through the bath about the unit to produce a dense, high quality electroplate on the workpiece, removing the electroplated workpiece from the bath, and withdrawing purified water from the electrodialysis recovery unit.

* * * * *